Oct. 13, 1925.

J. R. PADESKY

PRESSURE GAUGE

Filed April 28, 1924

1,556,877

Inventor
John R. Padesky
By Staley Burman
Attorneys

Patented Oct. 13, 1925.

1,556,877

UNITED STATES PATENT OFFICE.

JOHN R. PADESKY, OF LA CROSSE, WISCONSIN, ASSIGNOR TO THE NATIONAL GAUGE & EQUIPMENT COMPANY, OF LA CROSSE, WISCONSIN, A CORPORATION OF WISCONSIN.

PRESSURE GAUGE.

Application filed April 28, 1924. Serial No. 709,403.

*To all whom it may concern:*

Be it known that I, JOHN R. PADESKY, a citizen of the United States, residing at La Crosse, in the county of La Crosse and State of Wisconsin, have invented certain new and useful Improvements in Pressure Gauges, of which the following is a specification.

This invention relates to improvements in pressure gauges, the particular device shown in the drawings being for measuring the quantity of gasoline in the fuel tanks of automobiles, although the improvements are not necessarily limited to this particular type of gauge.

The object of my invention is to provide improved connections between the pressure responsive element and the indicating hand of the device of a simple character which comprises means whereby the parts may be readily calibrated.

Referring to the drawings.

Figure 1:
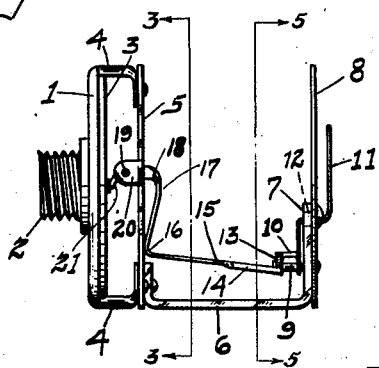
Fig. 1 is a side elevation of so much of a gauge as is necessary to illustrate the improvements.
Figure 2:
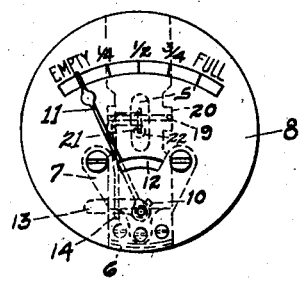
Fig. 2 is a front elevation of the same.
Figure 3:
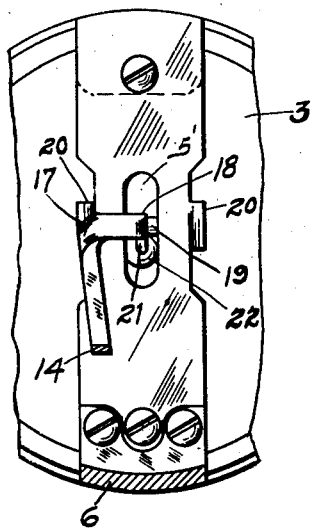
Fig. 3 is an enlarged section on the line 3—3 of Fig. 1.
Figure 4:
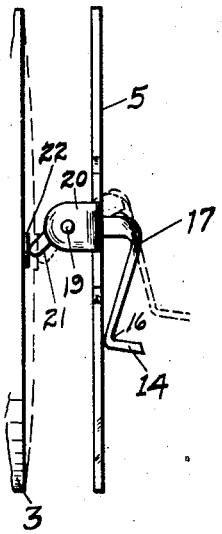
Fig. 4 is a side elevation of those parts shown in Fig. 3.
Figure 5:
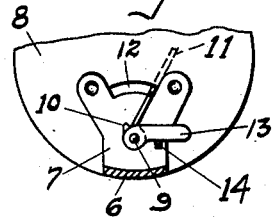
Fig. 5 is a section on the line 5—5 of Fig. 1.

Referring to the drawings, 1 represents a chamber provided with a threaded nipple 2 and having one side closed by a diaphragm 3 which forms the pressure responsive element. The chamber 1 carries a pair of oppositely-arranged brackets 4 connected by a bridge piece 5 of bendable metal and from the lower end of the bridge projects the horizontal portion 6 of a forwardly-extending bracket which has an upturned portion 7 at its forward end to which is connected a dial plate 8. The bracket portion 7 carries a horizontal pin 9 upon which is pivoted the yoke-shaped portion 10 of a pointer 11, the pointer being provided with a pair of right-angled bends to enable it to project through a slotted opening 12 in the dial plate in the usual way. The yoke-shaped portion of the pointer is provided with a projecting arm 13, the under-edge of which, when the pointer is in zero position, extends in a straight horizontal line as shown in Fig. 5. Cooperating with this arm 13 is the free end of a finger 14 formed of comparatively thin flat sheet metal which is twisted at one point of its length indicated at 15 so that an edge of the free end of the arm will cooperate with the under horizontal edge of the arm 13. The finger is formed with three right-angled bends 16, 17 and 18 and the rear end of the finger is projected through a slot 5′ in the bridge and is connected with a pin 19 which is journaled in ears 20 on the rear side of the bridge 5. Projecting from the pin is a short crank arm 21 the free end of which lies in close proximity to a button 22 centered on the diaphragm 3.

As a result of this construction when the diaphragm vibrates forwardly the finger 14 is rocked so as to raise the arm 13 and move the pointer about the dial. As before stated, the finger 14 is made of comparatively thin sheet metal and is formed with a quarter-turn twist 15. This enables the free outer end of the finger to be readily bent sidewise relatively to the arm 13 so as to properly calibrate the throw of the pointer and at the same time lends sufficient rigidity to the free end of the arm to maintain it in adjusted position.

Having thus described my invention, I claim:

1. In a gauge, a pressure responsive element, a pivoted pointer, a crank arm connected with said pointer having an edge which lies in a horizontal plane when said pointer is in zero position, a pivoted finger operated by said pressure responsive element and having its free end cooperating with the horizontal edge of said crank arm, said finger being of a readily bendable metal to permit the same to be properly positioned with respect to said crank arm.

2. In a gauge, a pressure responsive element including a diaphragm, a pivoted finger, a crank arm connected with said finger and cooperating with said diaphragm to move said finger, a pivoted pointer, a crank arm connected with said pointer and cooperating with the free end of said finger to move said pointer, the free end of said finger being of readily bendable material to permit the same to be positioned properly relatively to said pointer crank arm.

In testimony whereof, I have hereunto set my hand this 7th day of April, 1924.

JOHN R. PADESKY.